United States Patent
Tunks et al.

(10) Patent No.: US 9,377,828 B2
(45) Date of Patent: Jun. 28, 2016

(54) ADJUSTABLE HEAT SINK SUPPORTING MULTIPLE PLATFORMS AND SYSTEM CONFIGURATIONS

(71) Applicant: Dell Products L.P., Round Rock, TX (US)

(72) Inventors: Eric M. Tunks, Austin, TX (US); Stuart Allen Berke, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 227 days.

(21) Appl. No.: 13/964,466

(22) Filed: Aug. 12, 2013

(65) Prior Publication Data

US 2015/0043160 A1    Feb. 12, 2015

(51) Int. Cl.
*G06F 1/20* (2006.01)
*F28D 15/02* (2006.01)
*H05K 7/20* (2006.01)

(52) U.S. Cl.
CPC ..................................... *G06F 1/20* (2013.01)

(58) Field of Classification Search
CPC ............ H05K 7/20; G06F 1/20; H01L 23/34; F28F 3/02; F28F 7/00; F28D 15/00; F28D 15/02
USPC ....................... 361/679.46–679.55, 688, 689, 361/690–712, 715–724; 165/80.2, 80.3, 165/80.4, 104.14, 104.2, 104.33, 121–126; 257/706–727; 174/15.1, 15.2, 16.3
See application file for complete search history.

(56) References Cited

U.S. PATENT DOCUMENTS

| | | | |
|---|---|---|---|
| 5,168,921 A | 12/1992 | Meyer, IV | |
| 6,122,166 A | 9/2000 | Mochizuki et al. | |
| 6,532,141 B1 * | 3/2003 | Wu | 165/80.3 |
| 6,564,859 B2 * | 5/2003 | Reisfeld | 165/104.26 |
| 7,117,929 B2 * | 10/2006 | Curtis et al. | 165/80.3 |
| 7,411,791 B2 | 8/2008 | Chang et al. | |
| 7,694,726 B2 * | 4/2010 | Chen | 165/104.26 |
| 7,719,839 B2 | 5/2010 | Hoss et al. | |
| 7,944,688 B2 * | 5/2011 | Cheng et al. | 361/679.47 |
| 8,027,160 B2 | 9/2011 | Seow et al. | |
| 8,056,614 B2 * | 11/2011 | Chen et al. | 165/80.3 |
| 2005/0225942 A1 * | 10/2005 | Lee | 361/700 |
| 2006/0023423 A1 | 2/2006 | Kuo et al. | |
| 2006/0151153 A1 * | 7/2006 | Chen | 165/104.26 |
| 2010/0193175 A1 | 8/2010 | Gilliland et al. | |
| 2013/0175021 A1 * | 7/2013 | Takigawa et al. | 165/185 |

FOREIGN PATENT DOCUMENTS

JP    407066579 A  *  3/1995  ............... H05K 7/20

* cited by examiner

*Primary Examiner* — Michail V Datskovskiy
(74) *Attorney, Agent, or Firm* — Terrile, Cannatti, Chambers & Holland, LLP; Stephen A. Terrile

(57) ABSTRACT

An adjustable heat sink which allows factory, service, or customers to adjust the width of the heat sink to take advantage of some or all available unpopulated DIMM space to optimize cooling and performance. Such an adjustable heat sink addresses many of the limitations of other heat sinks and is advantageous for reducing part numbers within a platform and across platforms. Such an adjustable heat sink also simplifies field upgrades when either adding or removing populated DIMMs to an information handling system thus enhancing performance without a need to change CPU Heat sinks.

8 Claims, 10 Drawing Sheets

ADJUSTABLE HEAT SINK SUPPORTING MULTIPLE PLATFORMS AND SYSTEM CONFIGURATIONS

BACKGROUND OF THE INVENTION

1. Field of the Invention

The present invention relates in general to the field of heat sinks and more particularly to adjustable heat sinks which support multiple platforms and system configurations.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Due to physical form factor limitations, and overall chassis power and cooling limitations, dense information handling system platforms such as blade server platforms, often cannot simultaneously support maximum capacity, maximum performance, and maximum features. Reasonable configuration limitations (that minimize the restrictions) of simultaneously populated processors such as central processing units (CPUs), dual inline memory modules (DIMMs), Drives, input output (IO) Adapters, etc. address the needs of the majority of customers. However, optimizing the supportable configurations often requires design and or cost tradeoffs, or increased solution complexity.

One such tradeoff is the physical volume and air-path width of the heat sinks such as CPU heat sinks vs. a number of populated DIMMs located in proximity to the CPU. Another design consideration relates to supportable CPU thermal design power (TDP). Due to height constraints (which are often approximately 1 unit (1 U) of height), often with known blade servers the width of the CPU heat sink is increased to accommodate higher power CPUs. For example, CPUs with TDP<=80 W may be cooled with a relatively small heat sink, CPUs with TDP between 95-120 W with a larger/wider heat sink, and CPUs with TDPs>=130 W may require an even larger/wider heat sink to maintain maximum CPU performance (e.g., without thermal throttling).

While growing the CPU heat sink width allows higher power CPUs to be cooled, the increased heat sink width often occupies the physical volume requirements of non-CPU components, typically DIMM slots. Due to signal integrity requirements, it is desirable that DIMMs such as DDR3/DDR4 DIMMs be populated very close to the CPU and memory controller such as an integrated memory controller (iMC), and DIMMs be routed serially with a short lead-in to the first DIMM (typically <4-5") and minimal DIMM to DIMM spacing within a double data rate (DDR) channel (typically 0.330" to 0.400"). It is also desirable that channels be routed without interleaving of DIMMs from other channels, which increases DIMM to DIMM spacing reflections and degrades maximum achievable DDR frequency.

SUMMARY OF THE INVENTION

In accordance with the present invention, in one embodiment, an adjustable heat sink is provided which allows factory, service, or customers to adjust the width of the heat sink to take advantage of some or all available unpopulated DIMM space to optimize cooling and performance. Such an adjustable heat sink addresses many of the limitations of other heat sinks and is advantageous for reducing part numbers within a platform and across platforms. Such an adjustable heat sink also simplifies field upgrades when either adding or removing populated DIMMs to an information handling system thus enhancing performance without a need to change CPU Heat sinks. In alternate embodiments, the adjustable heat sink may be designed to take advantage of some or all available unpopulated space of other system components or assemblies.

More specifically, the adjustable heat sink comprises a main portion as well as an extendable portion. The main portion further comprises a heat sink base as well as a heat sink fin array coupled to the heat sink base. The extendable portion comprises an adjustable heat sink base as well as a heat sink fin array coupled to the adjustable head sink base. The main portion and the extendable portion are coupled via an adjustment mechanism which is thermally conductive. In certain embodiments, adjustment mechanism comprises heat pipes. Additionally in certain embodiments, the heat pipes are fixed to one of the main portion and the extendable portion and extend into the other of the main portion and the extendable portion via apertures which allow the other of the main portion and the extendable portion to slide along the heat pipes. Additionally, in certain embodiments, the adjustable heat sink further comprises another extendable portion. In certain embodiments, the extendable portion and the another extendable portion are positioned on opposite sides of the main portion. Additionally, in certain embodiments, the fin array comprises a stacked fin array.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
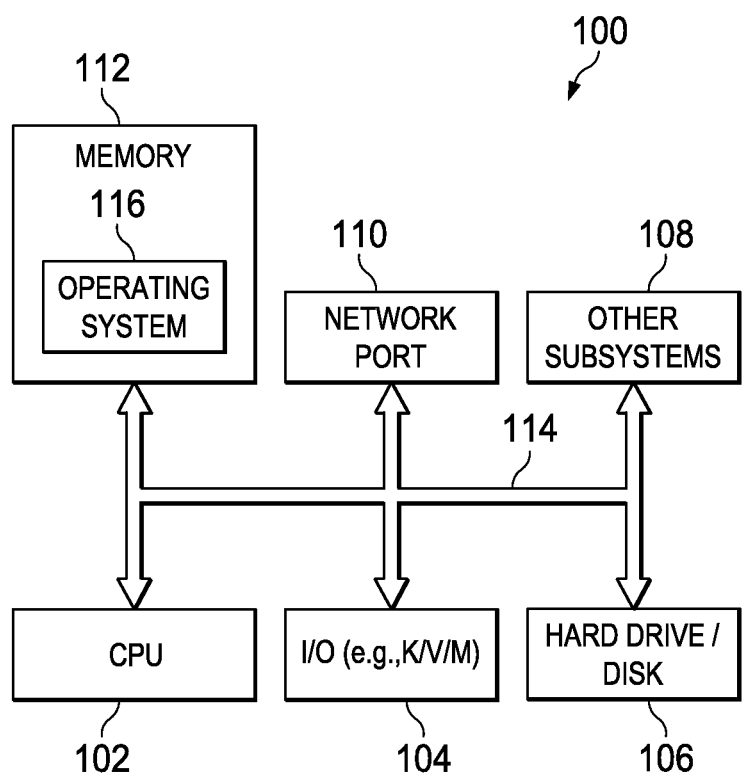
FIG. 1 shows a generalized illustration of components of an information handling system as implemented in the method and apparatus of the present invention.

FIG. 1 is a generalized illustration of components of an information handling system 100 as implemented in the method and apparatus of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other storage subsystems 108. The information handling system 100 likewise includes memory 112, including volatile and non-volatile memory which is interconnected to the foregoing via one or more buses 114. Memory 112 further comprises operating system (OS) 116.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
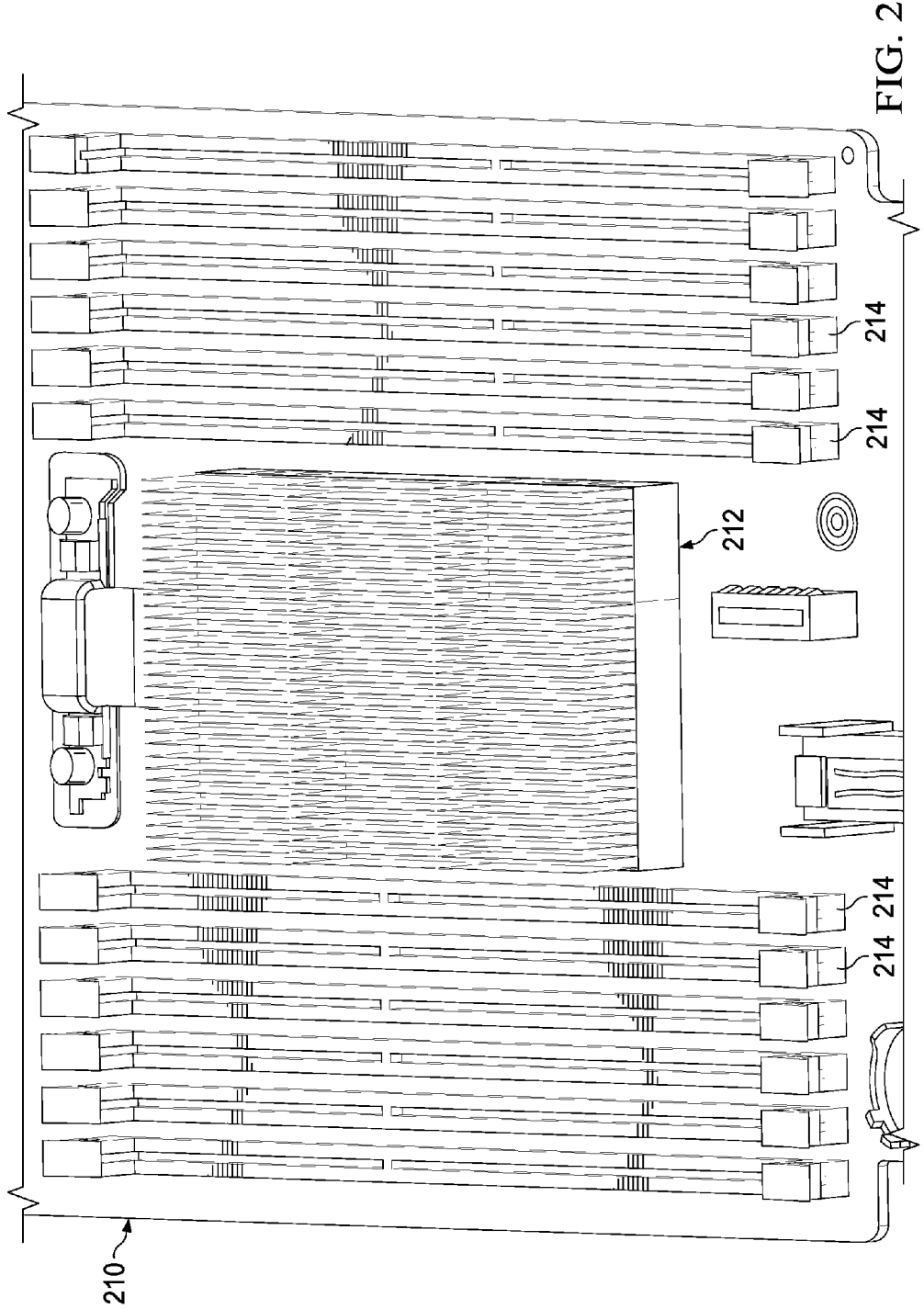
FIG. 2 shows an information handling system motherboard along with a heat sink in accordance with one aspect of the present invention.

Referring to FIG. 2, an information handling system motherboard 210 along with an adjustable heat sink 212 is shown. Some or all of the processor (e.g., central processor unit or CPU) 102, input/output (I/O) devices 104 and various other storage subsystems 108 may be coupled to the motherboard 210. Additionally, the motherboard includes memory sockets 214, such as DIMM sockets, into which memory such as memory 112 may be coupled. In certain embodiments, the heat sink 212 is thermally coupled to the processor 102.

More specifically, in certain embodiments the information handling system motherboard includes provision for two channels of DIMMs on each side of a CPU and three DIMM slots per channel (e.g., six DIMM slots per side and twelve DIMM slots per CPU). In the configuration shown in FIG. 2, the adjustable heat sink 212 is in its narrowest width configuration, which allows all twelve DIMM sockets to be populated with DIMM modules.

Figure 3:
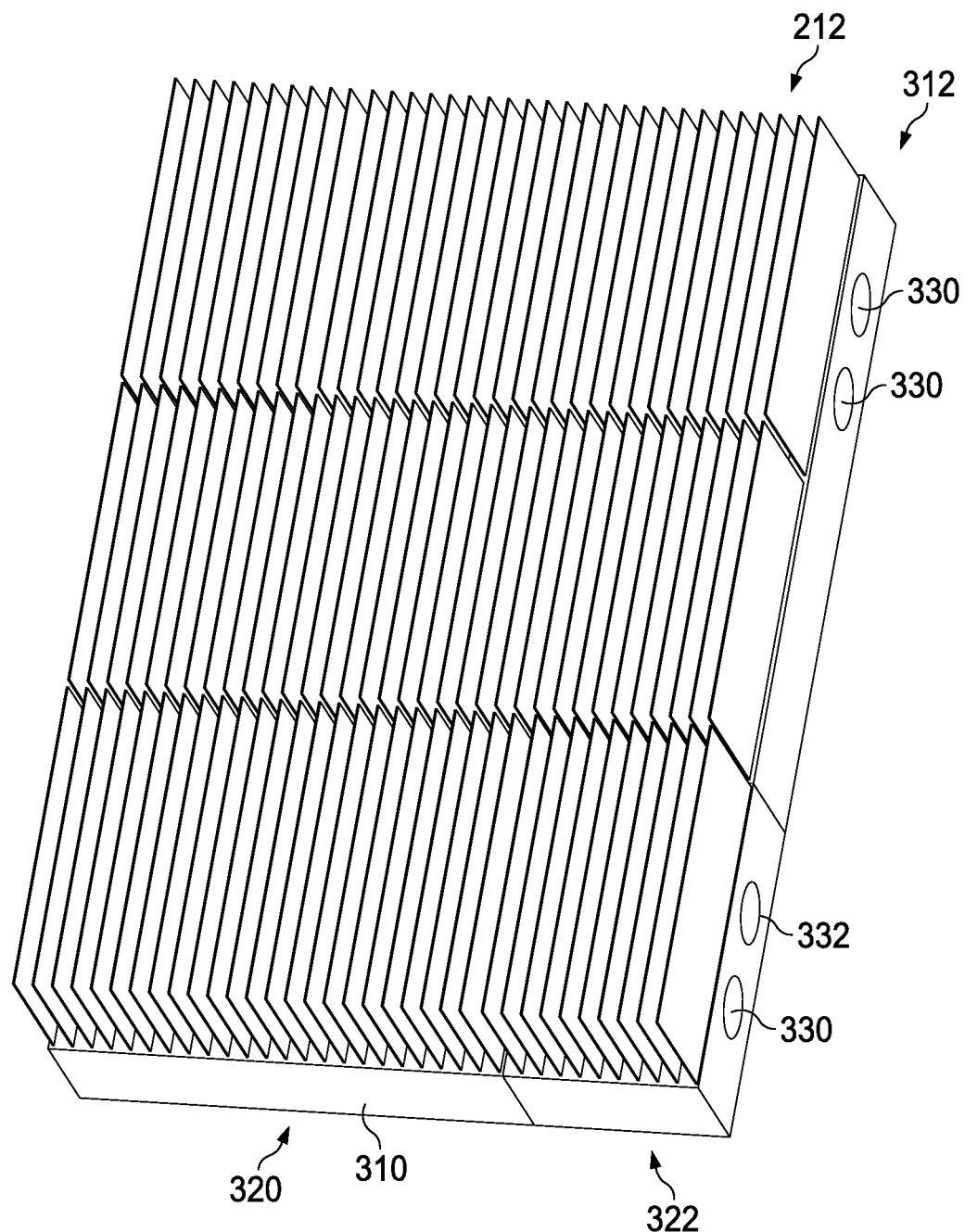
FIG. 3 shows a perspective view of a heat sink in accordance with one aspect of the present invention.

Referring to FIG. 3, a perspective view of a heat sink 212 is shown. The heat sink 212 is a passive heat exchanger component that cools a device by dissipating heat into the surrounding air. The heat sink 212 includes a base portion 310 as well as a heat dissipation portion 312. In certain embodiments, the heat dissipation portion comprises heat sink fin array which includes a plurality of heat sink fins such as a stacked fin array. It will be appreciated that other types of fin arrangements are also within the scope of the present invention.

The heat sink 212 includes a main portion 320 as well as an extendable portion 322. The main portion 320 comprises a heat sink base as well as a heat sink fin array coupled to the heat sink base. The extendable portion 322 comprises an adjustable heat sink base as well as a heat sink fin array coupled to the adjustable heat sink base. The main portion and the extendable portion are coupled via an adjustment mechanism which is thermally conductive. In certain embodiments, the adjustment mechanism comprises heat pipes 330. Additionally in certain embodiments, the heat pipes 330 are fixed to one of the main portion and the extendable portion (i.e., the extendable portion as this is the portion that extends) and extend into the other of the main portion and the extendable portion (i.e., the fixed portion as this is the portion from which the other portion extends) via apertures 332 which allow the other of the main portion and the extendable portion to slide along the heat pipes. More specifically, in certain embodiments, in the fixed portion, the heat pipes 330 are fixed (e.g., via solder or some other type of non-sliding thermal interface) into the holes in the fixed portion which include a thermally conductive interface between the sliding heat pipes and the body of the heat sink base. In certain embodiments, the heat pipes of each extension assembly extend towards and inside of precision drilled holes in the base portion of the main portion. A precision thermal/mechanical interface allows for effective heat transfer and structural rigidity. Thermal interface material, such as thermally conductive grease, between the heat pipes and main section base helps to ensure maximum thermal performance.

Figure 4:
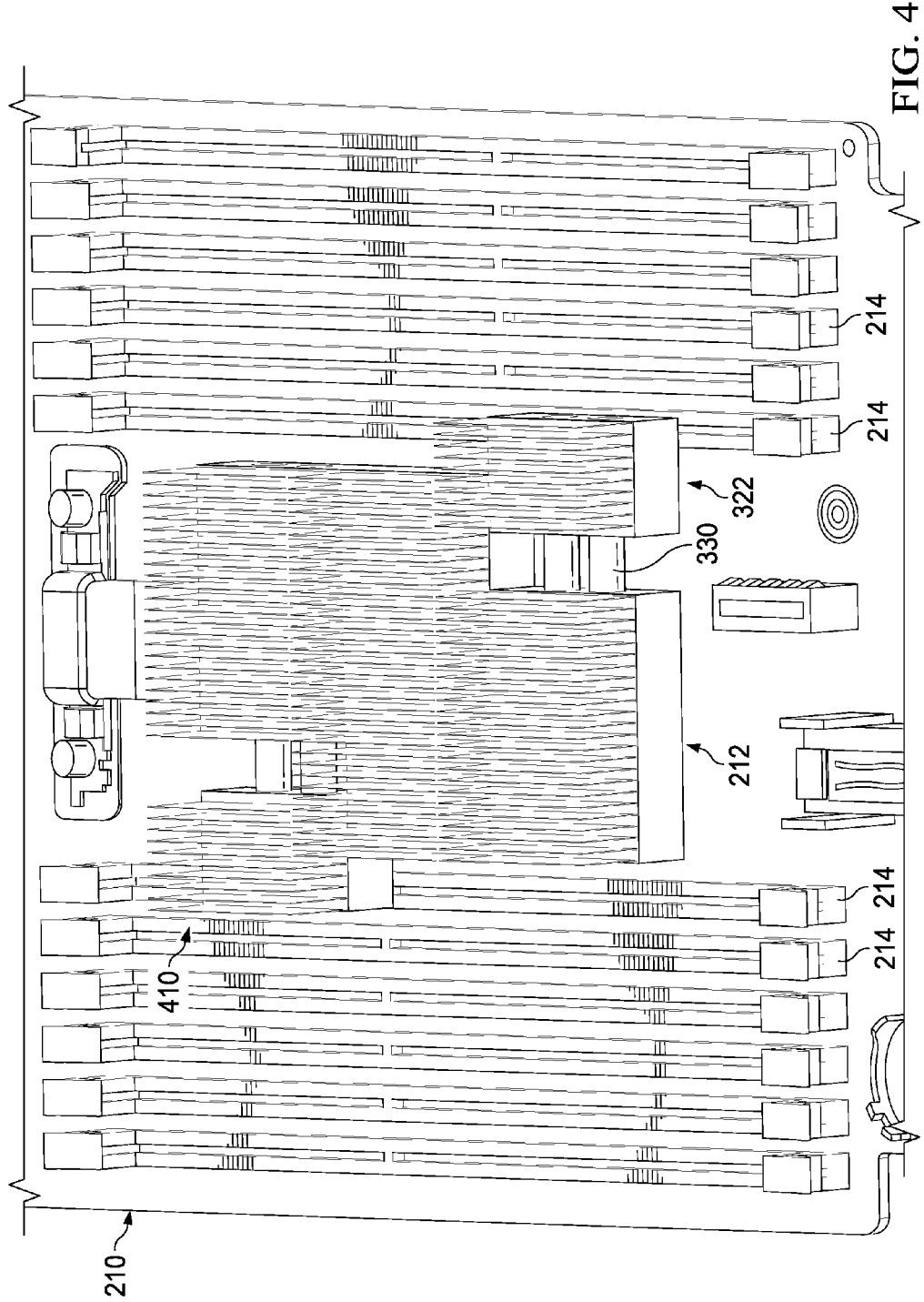
FIG. 4 shows an information handling system motherboard along with another configuration of a heat sink in accordance with one aspect of the present invention.

Referring to FIG. 4, an information handling system motherboard 210 along with another configuration of an adjustable heat sink 212 is shown. More specifically, the heat sink 212 includes the extendable portion 322 as well as another extendable portion 410. Each extendable portion 322, 410 is coupled to the main portion 320 via a plurality of heat pipes 330. In the configuration shown in FIG. 4, each of the extendable portions 322, 410 extend over a portion of a single memory socket. More specifically, the adjustable heat sink 212 is extended to occupy the space of one DIMM module pitch closest to the CPU on each side. This configuration allows up to ten DIMM sockets to be populated with DIMM modules. In certain balanced embodiments, this configuration would allow eight DIMM sockets to be populated for a balanced two DIMM per channel configuration). In this embodiment, the extendible portion 322, 410 would be affixed to the heat pipes and the heat pipes would extend into and slide within holes in the main portion of the heat sink. In this way, the outside dimension of the heat sink would be defined by how far the extendable portions extend away from the main portion.

Figure 5:
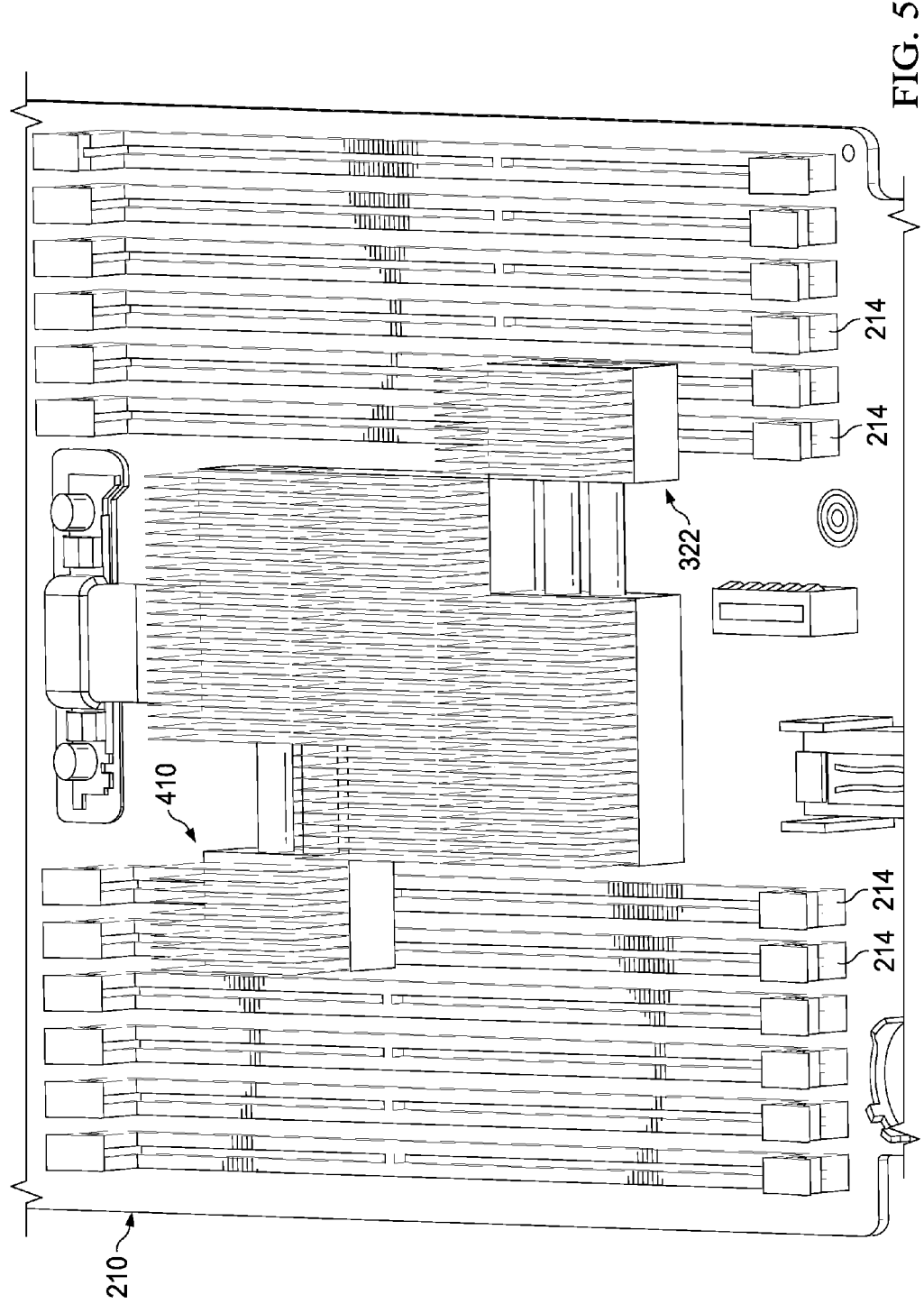
FIG. 5 shows an information handling system motherboard along with another configuration of a heat sink in accordance with one aspect of the present invention.

Referring to FIG. 5, an information handling system motherboard 210 along with another configuration of the adjustable heat sink 212 is shown. In the configuration shown in FIG. 5, each of the extendable portions 322, 410 extend over a portion of two memory sockets 214. In the configuration shown in FIG. 5, each of the extendable portions of the adjustable heat sink 212 is extended to occupy the space of two DIMM module pitches closest to the CPU on each side. This configuration allows up to eight DIMM sockets to be populated with DIMM modules. In certain balanced embodiments, this configuration would allow four DIMM sockets to be populated for a balanced one DIMM per channel configuration.

Figure 6:
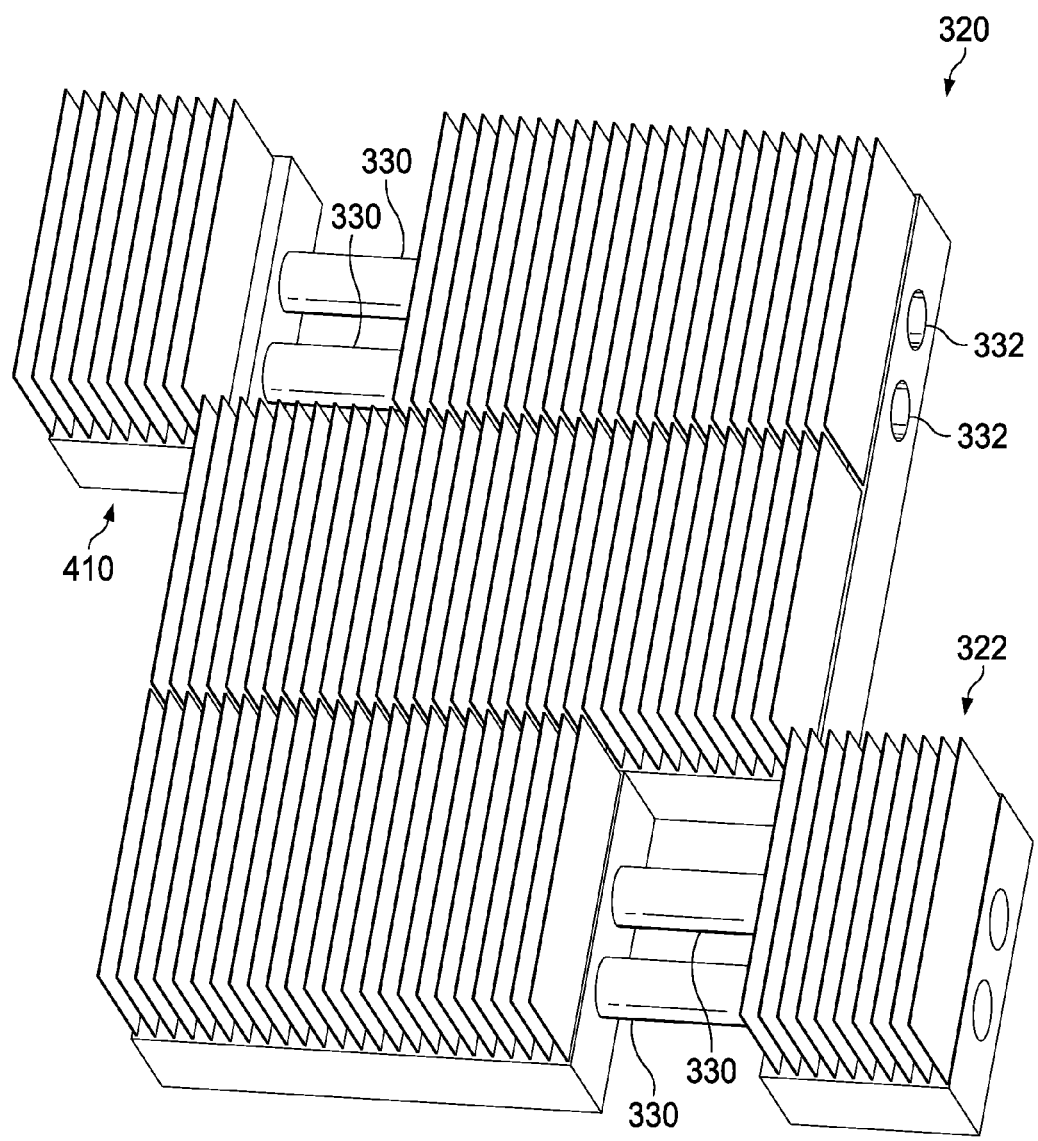
FIG. 6 shows a perspective view of a heat sink in accordance with one aspect of the present invention.

Referring to FIG. 6, a perspective view of the adjustable heat sink 212 is shown. The main portion 320 and the extendable portions 322, 410 are coupled via an adjustment mechanism which is thermally conductive. In certain embodiments, adjustment mechanism comprises heat pipes 330. Additionally in certain embodiments, the heat pipes are fixed to one of the main portion 320 and the extendable portions 322, 410 and extend into the other of the main portion and the extendable portion via apertures 332 which allow the other of the main portion and the extendable portion to slide along the heat pipes. In certain embodiments, the extendable portion 322 and the another extendable portion 410 are positioned on opposite sides of the main portion 320. Additionally, in certain embodiments, the fin array comprises a stacked fin array.

Figure 7:
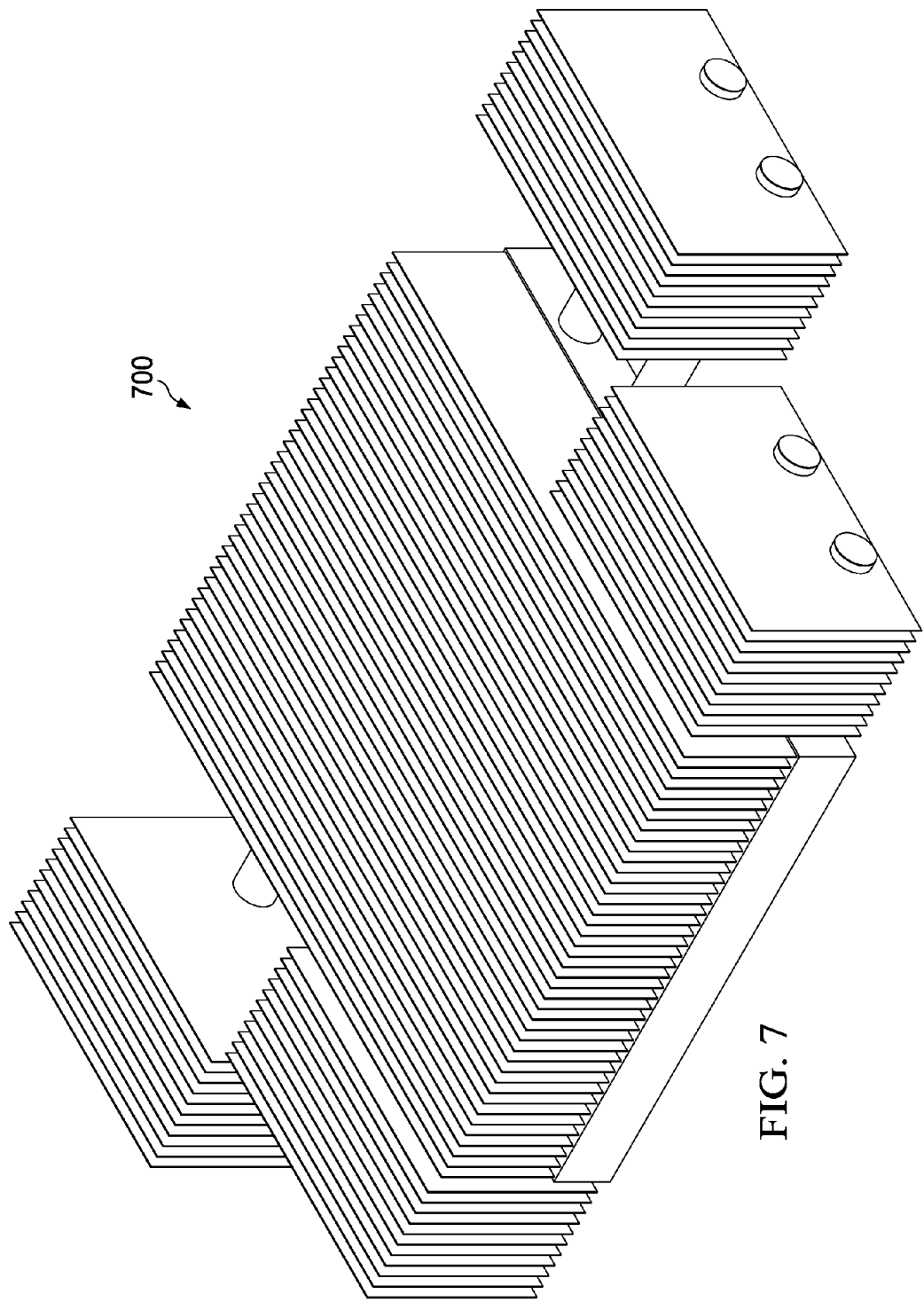
FIG. 7 shows a perspective view of a heat sink in accordance with another aspect of the present invention.

Referring to FIG. 7, a perspective view of another adjustable heat sink 700 is shown. More specifically, the adjustable heat sink 700 includes a main portion 710 as well as a plurality of extendable portions 712 thermally and physically coupled via an adjustment mechanism 720. The main portion 710 includes a base portion 730 as well as a heat dissipation portion 732. Each of the extendable portions 712 include respective heat dissipation portions 740 which are fixedly coupled to the adjustment mechanism. To adjust the extendable portions 712, the heat pipes move within respective apertures of the base portion 730 of the main portion 710.

Figure 8:
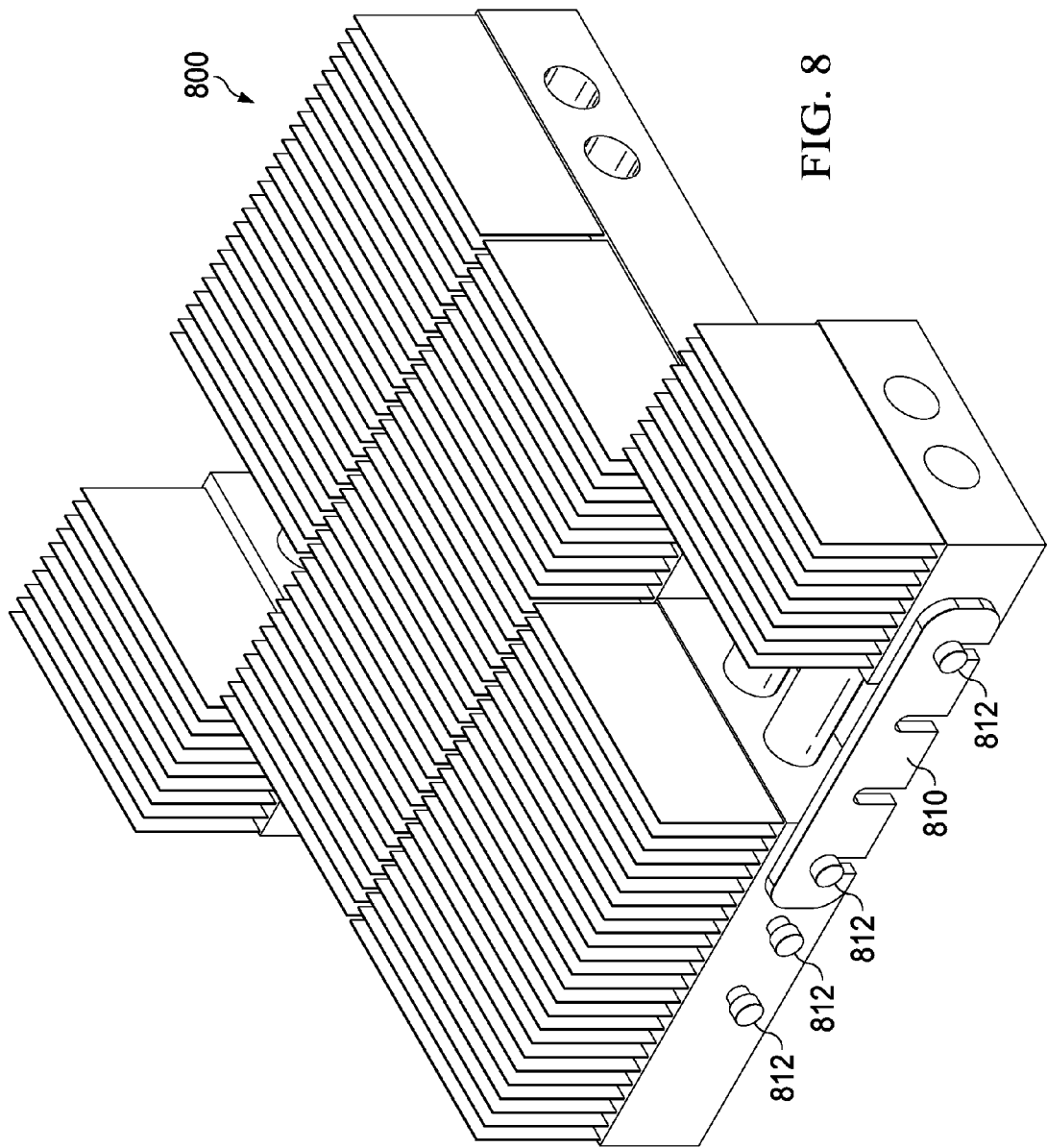
FIG. 8 shows a perspective view of a heat sink in accordance with another aspect of the present invention.
Figure 9:
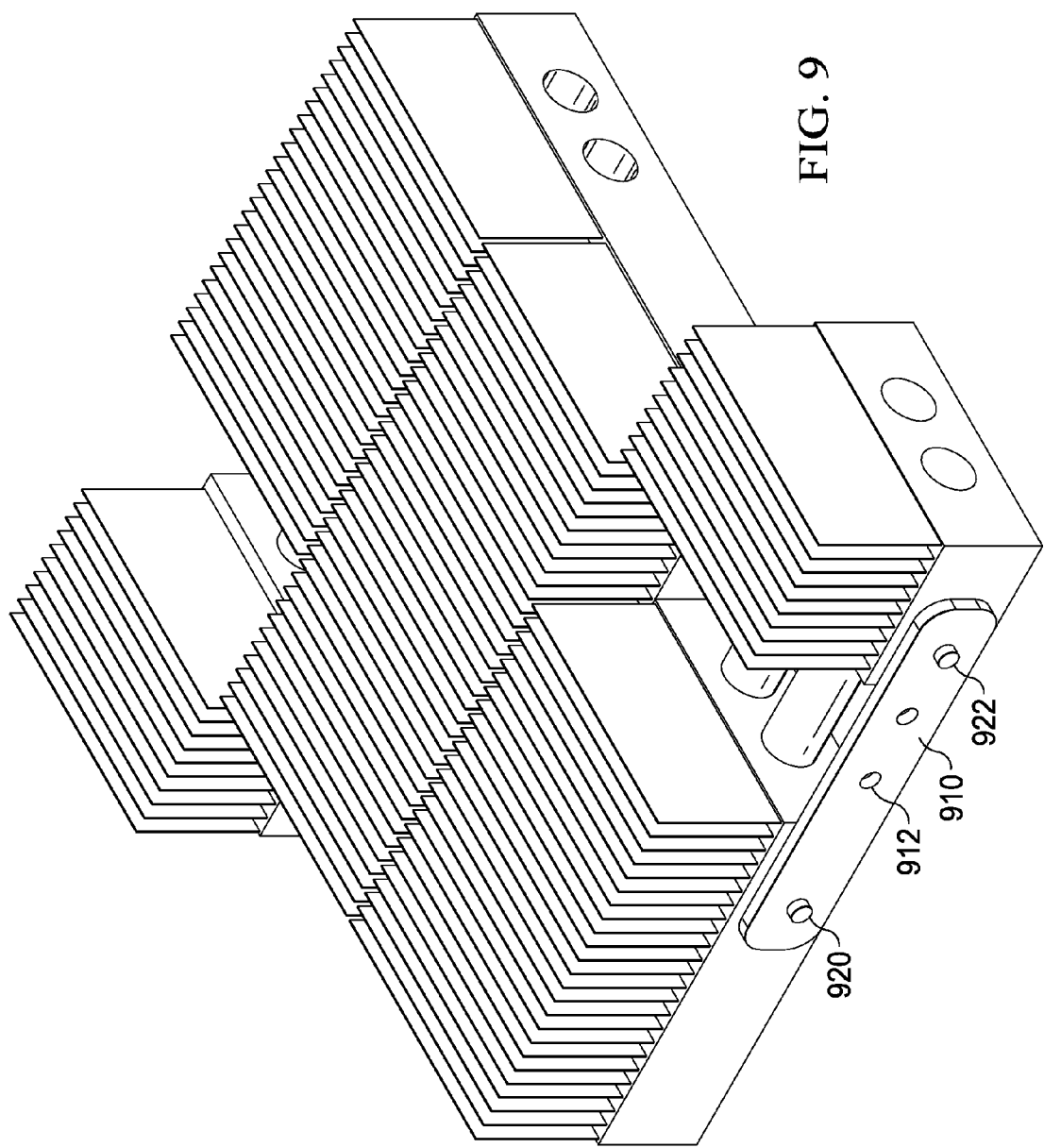
FIG. 9 shows a perspective view of a heat sink in accordance with another aspect of the present invention.
Figure 10:
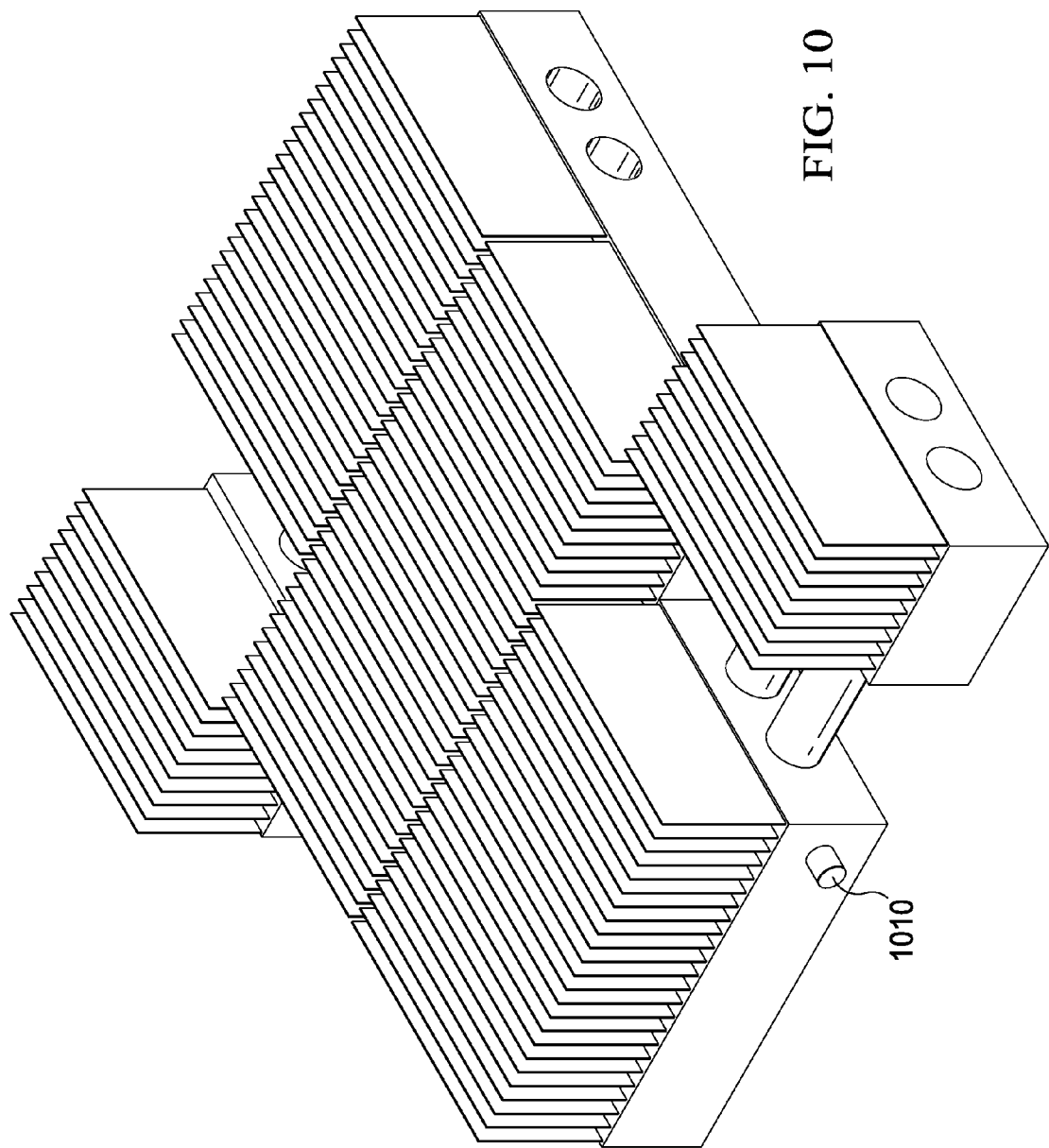
FIG. 10 shows a perspective view of a heat sink in accordance with another aspect of the present invention.

Referring to FIG. 8, a perspective view of an adjustable heat sink 800 is shown. More specifically, the adjustable heat sink 800 further includes a removable retention latch 810 that clamps down onto pins 812 that holds a respective extendable portion in a desired position. Referring to FIG. 9, a perspective view of an adjustable heat sink 900 is shown. More specifically, the adjustable heat sink 900 further includes a retention latch 910 which includes a plurality of apertures. The retention latch is fixed to the main base portion (e.g., via pin 920) and bends to snap onto a pin 922 on the extension section in any of the desired positions. Referring to FIG. 10, a perspective view of an adjustable heat sink 1000 is shown. More specifically, the adjustable heat sink 1000 further includes a retention device such as a retention screw 1010 that holds the heat pipe in place to keep the extendable portion in a desired position.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the information handling system may include an ability for system firmware to detect the current adjustable heat sink position. Also for example, the information handling system may include an ability to determine if the current adjustable Heat sink position is optimal for the populated DIMMs, and if not to alert a user that the heat sink may be extended for optimal performance or to use electro-mechanical means to extended the Heat sink automatically without use intervention. Also for example, the heat sink may be adjusted for optimal acoustic performance (e.g., for acoustic level and tones) vs. populated DIMM Slots. Also for example, the heat sink may be adjusted for optimal air flow, for impedance vs. System Performance, or for power dissipation vs. populated DIMM Slots. Also for example, with other motherboard configurations, the head sink may be adjusted based upon other non-DIMM devices or subsystems.

What is claimed is:

1. A heat sink comprising:
   a main portion, the main portion comprising a heat sink base and a heat dissipation portion;
   an extendable portion thermally coupled to the main portion, the extendable portion comprising an adjustable heat sink base and a heat dissipation portion; and,
   another extendable portion thermally coupled to the main portion, the another extendable portion comprising an adjustable heat sink base and a heat dissipation portion;
   an adjustment mechanism, the adjustment mechanism thermally and physically coupling the main portion, the extendable portion and the another extendable portion; and wherein
   the extendable portion and the another extendable portion are positioned on opposite sides of the main portion, the extendable portion extending perpendicularly from the base portion in a first direction and the another extendable portion extending perpendicularly from the base portion in a second direction, the second direction being opposite that of the first direction; and,
   the extendable portion is configured to selectively extend over a portion of first and second memory sockets of an information handling system motherboard depending on whether memory modules are inserted within one or both of the first and second memory sockets and the another extendable portion is configured to extend over third and fourth memory sockets of an information handling system motherboard a portion of a memory socket of the information handling system motherboard depending on whether memory modules are inserted within one or both of the third and fourth memory sockets.

2. The heat sink of claim 1 wherein:
   the adjustment mechanism comprises a heat pipe, the heat pipe coupling the main portion and the extendable portion.

3. The heat sink of claim 2 wherein:
   the heat pipe is fixed to one of the main portion and the extendable portion and extends into the other of the main portion and the extendable portion via an aperture, the aperture allowing the other of the main portion and the extendable portion to slide along the heat pipe.

4. The heat sink of claim 1 wherein:
   the main portion heat dissipation portion and the extendable portion heat dissipation portion comprise respective fin arrays.

5. An information handling system comprising:
   a motherboard, the motherboard comprising first, second third and fourth memory sockets;
   an adjustable heat sink, the adjustable heat sink comprising
      a main portion, the main portion comprising a heat sink base and a heat dissipation portion;
      an extendable portion thermally coupled to the main portion, the extendable portion comprising an adjustable heat sink base and a heat dissipation portion;
      another extendable portion thermally coupled to the main portion, the another extendable portion comprising an adjustable heat sink base and a heat dissipation portion; and,
      an adjustment mechanism, the adjustment mechanism thermally and physically coupling the main portion and the extendable portion, the extendable portion and the another extendable portion; and wherein the extendable portion and the another extendable portion are positioned on opposite sides of the main portion, the extendable portion extending perpendicularly from the base portion in a first direction and the another extendable portion extending perpendicularly from the base portion in a second direction, the second direction being opposite that of the first direction; and, the extendable portion is configured to selectively extend over a portion of the first and second memory sockets of an information handling system motherboard depending on whether memory modules are inserted within one or both of the first and second memory sockets and the another extendable portion is configured to extend over the third and fourth memory sockets of an information handling system motherboard a portion of a memory socket of the information handling system motherboard depending on whether memory modules are inserted within one or both of the third and fourth memory sockets.

6. The information handling system of claim 5 wherein:

the adjustment mechanism comprises a heat pipe, the heat pipe coupling the main portion and the extendable portion.

7. The information handling system of claim 6 wherein:

the heat pipe is fixed to one of the main portion and the extendable portion and extends into the other of the main portion and the extendable portion via an aperture, the aperture allowing the other of the main portion and the extendable portion to slide along the heat pipe.

8. The information handling system of claim 5 wherein:

the main portion heat dissipation portion and the extendable portion heat dissipation portion comprise respective fin arrays.

* * * * *